Oct. 12, 1965 T. WOLF 3,210,814
RESILIENT DETACHABLE CLIP
Filed Oct. 16, 1963

INVENTOR.
Theophil Wolf
BY
ATTORNEY

United States Patent Office 3,210,814
Patented Oct. 12, 1965

3,210,814
RESILIENT DETACHABLE CLIP
Theophil Wolf, 145 Baltusrol Ave., Springfield, N.J.
Filed Oct. 16, 1963, Ser. No. 316,724
6 Claims. (Cl. 24—3)

The present invention deals with a resilient clip and more particularly with a resilient clip attachment for eyeglass temple bars and the like elongated structures.

Pocket carried eyeglasses, or other articles, which are frequently pocketed after use are subject to dislodgement from the pocket or from elsewhere on the person using the eyeglasses or articles and occasionally become lost or broken due to the dislodgement. In order to avoid loss or breakage, the articles or glasses are provided with detachable retaining clips on the elongated portions thereof, e.g., eyeglass temple bars. Such conventional clips have the disadvantage of losing their grip when strained beyond their low limits of flexibility during pocketing, or they are not adaptable for fitting onto a variety of elongated structures of different thicknesses and widths.

It is an object of this invention to provide a resilient detachable clip for pocket-carried articles.

It is another object of the invention to provide a clip for eyeglass temple bars and particularly adapted for use on a variety of temple bars of different widths and thicknesses.

It is a further object of the invention to provide a resilient clip which inherently retains its gripping action over a wide range of thickness of the pockets or other locations on the person to which the clip is applied.

Figure 1:
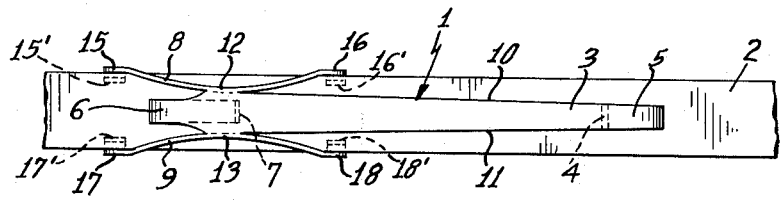
Figure 2:
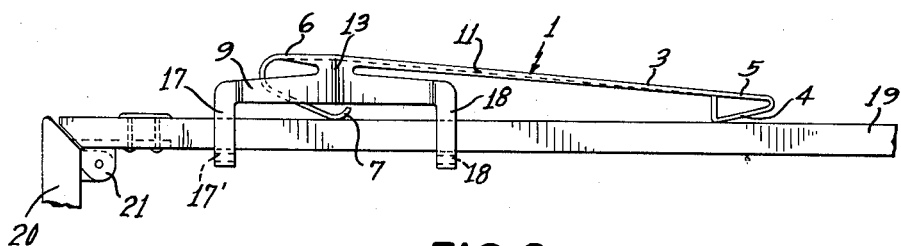
Figure 3:
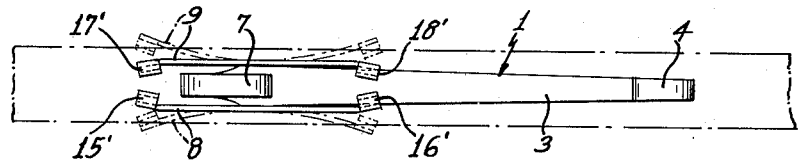
Figure 4:
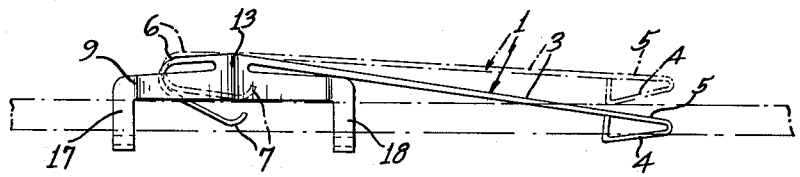

Other objects of the invention will become apparent from the description hereinafter following and drawings forming a part hereof, in which:

FIGURE 1 illustrates a top view of the clip applied to an elongated article shown as a fragmentary portion thereof, FIGURE 2 illustrates a side view of the same clip applied to an eyeglass temple bar, FIGURE 3 illustrates a bottom view of the same clip in free position and by broken line showing the adaptability in applied position to compensate for variations in temple bar widths, FIGURE 4 illustrates a side view of FIGURE 3 in free position and by broken line showing the adaptability in applied position to compensate for variations in temple bar thicknesses.

Referring to the figures, the clip 1 is shown in top view as applied to an elongated article 2. The clip comprises an elongated flexible arm 3 having a gripping nib or claw 4 at one or first end portion 5 thereof. The other or second end portion 6 of the arm is curved or bent over in the direction of the first end portion 5 in spaced relationship with the arm 3 to provide a spring means 7 adjacent the second end portion 6 and beneath the arm 3. While the thus formed spring means is integral with the arm 3, other suitable substitute spring means may be advantageously so located.

A pair of substantially parallel elongated flexible fingers 8 and 9 are laterally spaced from each other and each being connected to one longitudinal edge 10 and 11, respectively, by neck means 12 and 13 intermediate the ends thereof, the necks being connected to said edges substantially directly opposite each other adjacent said second end portion, the fingers being directed along the longitudinal axis of arm 3 preferably co-extensively of each other and extending outwardly of the arm 3 in a common direction with the spring means 7 located therebetween. The expression "substantially parallel" is meant to include some departure from the strict sense in that the fingers may be somewhat curved as well as straight. The fingers 8 and 9 are each provided with a pair of legs 15, 16 and 17, 18, respectively, extending in a common direction each from an end portion of a finger and extending below the spring means 7. The free ends of legs 15, 16 and 17, 18 are each provided with inwardly directed claw means 15', 16', 17' and 18' with the pair of claw means on the legs of one finger facing the claw means of the other finger.

In application, according to FIGURE 1, the clip is positioned on one side of an elongated article 2 with the two pairs of legs straddling the article. The clip is then pressed onto the article until the spring 7 is in abutment therewith and the claws embrace the opposite side of the article.

FIGURE 2 illustrates the application of the clip onto an eyeglass temple bar 19. The temple bar is mounted on an eyeglass frame 20 by hinge means 21.

FIGURES 3 and 4 illustrate the application of the clip showing the manner in which the clip compensates for a variety of temple bar thicknesses and widths.

It is now apparent that the spring means as described above will maintain the clip under gripping spring tension over wide variations in temple bar thicknesses, while at the same time the pair of resilient fingers will maintain a resilient grip on the bar over a wide range of temple bar widths. The combination of the spring means and the pair of elongated fingers operate to provide for retention of gripping action regardless of normal variations in not only temple bar dimensions, but also regardless of normal variations in the thickness of the material gripped between the arm claw 4 and the temple bar.

What is claimed is:

1. A clip comprising an elongated flexible arm, the arm having first and second end portions, gripping means located at the first end portion, spring means connected to, adjacent, and below the second end portion, a pair of flexible elongated laterally spaced fingers each positioned adjacent a longitudinal edge of the arm and longitudinally directed along the longitudinal axis of the arm, narrow neck means intermediate the ends of the fingers and connecting the fingers to the edges of the arm, the narrow neck means each extending in a common direction downwardly from their respective edges with the fingers thereby located below the arm, each finger having a leg at the end portions thereof, the legs extending downwardly from the fingers in a substantially common direction relative to the neck means and beyond the said spring means, the spring means being located intermediate the ends of the fingers, the free ends of the legs each being provided with inwardly directed claw means.

2. A clip according to claim 1, wherein the second end portion of the arm is bent under itself with the free end thereof extending in the direction of the first end portion and spaced from the arm so that said bent portion constitutes said spring means.

3. A clip according to claim 1, wherein the first end portion of the arm is bent under itself so that said bent first portion constitutes the gripping means.

4. A clip according to claim 1, wherein the fingers are flexible fingers.

5. A clip attachment for elongated articles comprising an elongated flexible arm, the arm having first and second end portions, gripping means located at the first end portion, spring means connected to and positioned below the second end portion, a pair of flexible elongated laterally spaced fingers each positioned adjacent a longitudinal edge of the arm and longitudinally directed along the longitudinal axis of the arm, narrow neck means intermediate the ends of the fingers and connecting the fingers to the edges of the arm, the narrow neck means each extending in a common direction downwardly from their respective edges with the fingers thereby located below the arm, each finger having a leg at the end portions thereof, the legs extending downwardly from the fingers in a substantially common direction relative to the neck means and beyond the spring means, the spring means being located intermediate the ends of the fingers, the free ends of the legs each being provided with inwardly directed claw means, the spring means and gripping means contacting a surface of the elongated article, and the legs embracing the article.

6. A clip for elongated articles according to claim 5, wherein the elongated article is an eyeglass temple bar.

References Cited by the Examiner

UNITED STATES PATENTS

| D. 24,768 | 10/95 | Wood. | |
|---|---|---|---|
| D. 52,144 | 7/18 | Nunn. | |
| 789,668 | 5/05 | Pickens. | |
| 1,671,811 | 5/28 | Centanni | 24—3 |
| 1,898,059 | 2/33 | McDonald | 24—3 |
| 2,050,917 | 8/36 | Biggs et al. | 24—3 |
| 2,111,994 | 3/38 | Roth | 24—3 |
| 2,467,604 | 4/49 | Tinnerman et al. | 24—259 X |
| 3,112,734 | 12/63 | Zepell | 24—11 X |

FOREIGN PATENTS

| 894,217 | 10/53 | Germany. |
|---|---|---|
| 934,749 | 11/55 | Germany. |

DONLEY J. STOCKING, *Primary Examiner.*